C. W. COLLINS.
TRANSMISSION GEARING FOR AUTOMOBILES.
APPLICATION FILED DEC. 29, 1910.
999,699.
Patented Aug. 1, 1911.
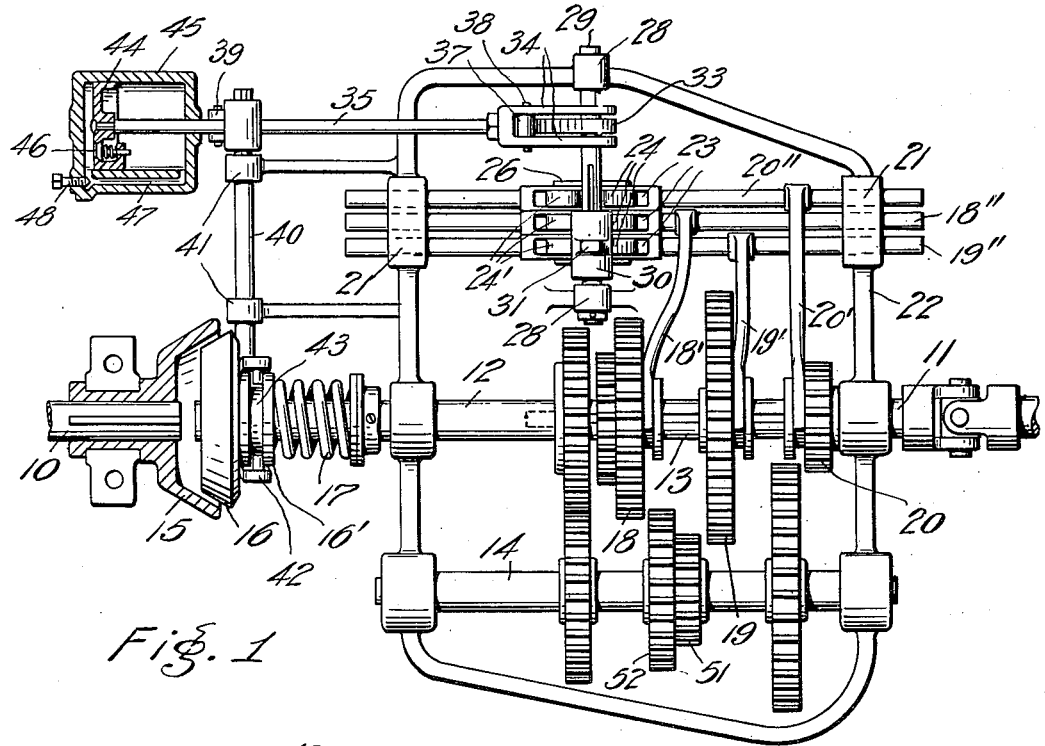
Fig. 1
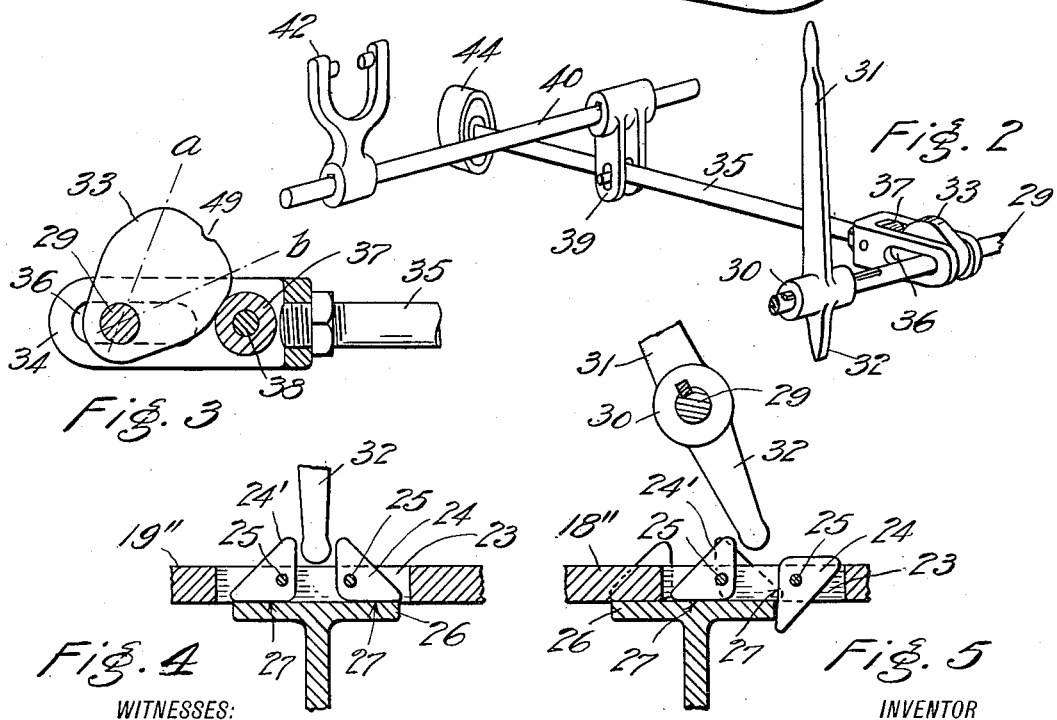
Fig. 2
Fig. 3
Fig. 4
Fig. 5
WITNESSES:
H. Barnes
E. Peterson
INVENTOR
Charles W. Collins
BY
Pierre Barnes
ATTORNEY

UNITED STATES PATENT OFFICE.

CHARLES W. COLLINS, OF SEATTLE, WASHINGTON.

TRANSMISSION-GEARING FOR AUTOMOBILES.

999,699.     Specification of Letters Patent.     Patented Aug. 1, 1911.

Application filed December 29, 1910. Serial No. 599,985.

*To all whom it may concern:*

Be it known that I, CHARLES W. COLLINS, a citizen of the United States, residing at Seattle, in the county of King and State of Washington, have invented certain new and useful Improvements in Transmission-Gearing for Automobiles, of which the following is a specification.

The object of this invention is the improvement in power transmission gearing for automobiles whereby a single controlling agent regulates the actions of the clutch and of the gears wherewith the various changes of speed and the reverse movement of the vehicle are accomplished.

The invention consists in the novel construction and combination of parts, as will be hereinafter described and claimed.

In the accompanying drawings Figure 1 is a plan view of sufficient of the driving mechanism of an automobile as is necessary to illustrate the invention, one of the clutch members and the cushioning devices for the clutch being shown in section. Fig. 2 is a perspective view of the controlling lever and clutch operating parts with which it is connected. Fig. 3 is a detail longitudinal section of the clutch controlling cam and associated parts. Fig. 4 is a fragmentary detail view shown partly in side elevation and partly in section of the connection between the controlling lever and a gear shifting-bar. Fig. 5 is a view similar to Fig. 4 with the parts in different positions.

The reference numeral 10 designates the power shaft and 11 the shaft from which the vehicle is driven through the medium of shafts 12 and 13 direct or through the shaft 12 and an "intermediate" shaft 14. Said power-shaft is releasably coupled to the shaft 12 by means of a friction clutch, which is herein illustrated as comprising a cup-member 15, mounted for rotation on the power-shaft and a complementary member 16 which is splined to the shaft 12.

A spring 17 acts to yieldingly retain the clutch member 16 in operative position for effecting the driving of the shaft 12, whence rotary motion to the shafts 11, 13 and 14 obtains through gear wheels such as ordinarily employed in change speed automobile devices.

The change speed drive herewith indicated is suitable for imparting a reverse motion and four forward speeds to the vehicle driving shaft 11, a detailed description of which not being deemed necessary for an understanding of my invention. The gears 18, 19 and 20, however, are splined for axial movement upon the shaft 13 and are individually shifted to perform their respective duties by means of forked arms 18', 19' and 20' engaging peripherally grooved hubs of the gears and being themselves actuated by the manually controlled longitudinally disposed shifter-bars 18", 19" and 20" to which the several arms are rigidly secured. Said shifter bars are mounted for endwise movements in guides 21 provided in the walls of the gear casing 22. According to the present invention, each of these bars is provided with a longitudinal slot 23 to accommodate two angle blocks 24, 24' which, as best shown in Figs. 4 and 5, are pivotally connected to the respective bar by pins 25. Subjacent to the bars is a ledge 26 which may be made integral with, or rigidly connected to, the aforesaid gear casing and, upon occasion, serves as a support for the base edge 27 of said blocks. Journaled in bearings 28 of said casing is a transversely disposed shaft 29 positioned at a distance above said bars and in a plane medially of the width of the ledge. Splined to this shaft for axial movement thereon is the boss 30 of a controlling lever having an arm 31 which extends upwardly and into convenient reach of the operator, and a pendent arm 32 which is arranged to engage any one of said blocks to actuate a predetermined one of the shifting bars, as will be presently explained. The shaft 29 also carries a cam 33 interposed between branches 34 provided at the end of a rod 35. These branches are each provided with a slot 36 through which the shaft 29 extends and act in conjunction therewith as guides for maintaining the axis of the rod in a plane with the axis of the shaft. 37 represents a roller located between the rod-branches and mounted on an axle 38 secured thereto.

Intermediate of its length, the rod 35 is connected to an arm 39 extending downwardly from a transversely arranged rock-shaft 40 which is journaled for oscillatory motion in bearings, indicated by 41, in Fig. 1. Said rock-shaft carries an upwardly directed forked-arm 42 which engages in a peripheral groove 43 of the hub 16' of the clutch member 16.

44 represents a piston secured to the rod 35 to operate within a liquid containing cylinder 45 serving as a dash-pot, so to speak, to regulate the coupling movement of the clutch member in opposition to the spring 17. More particularly, said piston is provided with a spring pressed non-return valve 46 affording a relatively unrestricted flow of a liquid from one side of the piston to the other, while closing, through the agency of the valve spring to prevent any reverse flow through the piston. The restoration of the liquid is, however, effected through a by-passage 47 provided in the cylinder shell, but the return flow of the liquid is more or less retarded by means of an adjustable obturating screw 48 extending into such passage.

The referred-to cam 33 has a cam surface which is concentric, or nearly so, to the axes of its shaft 29 as, for example, between the radial lines a—b in Fig. 3 and centrally of such concentric portion the cam is desirably provided with a recess 49.

The operation of the invention may be explained by the following specific example: To change the speed of the vehicle from that derived through the coöperative action of the pinion 51, on intermediate shaft 14 with gear 19 on shaft 13, to the speed which would ensue by the pinion 52 coöperating with the gear 18. To effect such a change, the controlling lever is manipulated to effect a turning movement of the shaft 29 resulting primarily in the cam 33 exerting an endwise movement to the rod 35 to impart motion through arm 39 to the shaft 40 and influence the arm 42 to result in the disengagement of the clutch member 16 in opposition to spring 17. Following such disengagement of said clutch member, the lever arm 32 encounters the block 24 of shifting-bar 19″, in the present example, and thence the bar is moved with the controlling lever until the latter is swung into an upright or "neutral" position, resulting in the blocks 24 and 24′ of the affected bar 19″ being brought into the transverse rows of the correspondingly indicated blocks of the other shifter bars and coincident with the withdrawal of the gear 19 from pinion 51. The controlling lever is now moved laterally to transpose the lever arm 32 from between the blocks of bar 19″ to a similar position between the blocks of the bar 18″. The controlling lever is then operated to cause its arm 32 to push against the block 24 of the bar 18″ to shove the latter endwise, thereby moving the gear 18 into mesh with the pinion 52. Meanwhile, the cam 33 remains operative to retain the clutch member 16 in inoperative position. The continued movement of the controlling lever carries the block 24 beyond the ledge 26 and the block, being then unsupported thereby, is tilted over into the position in which it is represented in Fig. 5. The controlling lever in its further movement is unaccompanied by the shifting bar 18″, but the subsequent movement of the lever influences the cam to swing the same into inoperative condition with the result that the spring 17 is rendered operative to restore the clutch member 16 to operatively connect the gear shafts with the power shaft 10. In order that the clutching operation may be gradually accomplished, the coupling movement of the clutch member 16 is retarded through the instrumentality of the dash-pot devices, that is to say, the stroke of the piston 44 is then opposed by the body of liquid entrained in the space within the cylinder to the right hand of the piston (Fig. 1) and wherefrom the liquid can only escape through the relatively small passageway 47 leading to the other side of the piston.

From the foregoing, it is obvious that, prior to the shifting of any of the gears out of mesh with its companion, the clutch is essentially made inoperative and is thus maintained until after another gear is put into mesh with its companion. Moreover, alterations of all of the change gears such as used in automobiles, together with the proper control of the clutch, are performed with a single controlling agent, something, I believe, which has hitherto not been attained.

What I claim, is—

1. Transmission gearing for automobiles, comprising speed changing gears, shifting devices for the respective gears, a clutch, and clutch operating mechanism, an adjustably movable member for successively actuating said clutch operating mechanism, and a selected one of said gear shifting devices.

2. Transmission gearing for automobiles, including a clutch, and gear shifting devices, a lever arranged to be laterally shifted for selectively engaging said gear shifting devices, and means rendered operable by the oscillation of said lever whereby the clutch is caused to be inoperative during the actuation of a predetermined one of said shifting devices.

3. Transmission gearing for automobiles, comprising change speed gears, a clutch, a spring acting to maintain the clutch in operative condition, and normally inoperative mechanical connections between the various gears and the clutch, of a manually actuated means for causing said connections to become operative with respect to any of said gears for shifting the same and likewise causing the clutch to become inoperative during the shifting of such gears and ultimately restore said connections to their inoperative condition whereby said spring is rendered capable of making said clutch operative.

4. Transmission gearing for automobiles, comprising change-speed gears, shifting devices for the respective gears, a clutch, a spring for effecting the coupling of the clutch members, mechanism arranged to act in opposition to said spring for effecting the uncoupling of said clutch members, a hand-lever arranged to actuate in succession the aforesaid mechanism, a selected one of the gear shifting devices, and then render said mechanism inoperative in order to render said spring operative to restore the clutch to its operative condition.

5. In transmission gearing for automobiles, a plurality of change-speed gears, shifting devices for the respective gears, a clutch member, a lever operatively connected with said clutch member and adapted to be interchangeably utilized with said gear shifting devices whereby the clutch member is maintained in disengaged condition during the operation of either of said gear shifting devices.

6. In transmission gearing for automobiles, the combination with the change-speed gears, shifting bars operatively connected therewith, a clutch, a shaft, a cam mounted upon said shaft, operative connections between the cam and said clutch, a controlling lever splined to said shaft for independent movement axially therewith, and devices provided on the respective shifting bars whereby said bars may be individually actuated by said lever to afford shifting movement to the associated gears concurrently with the cam being operated to maintain the clutch in inoperative condition.

7. In transmission gearing for automobiles, the combination with a clutch, a cam operatively connected with the clutch, the change-speed gears, shifting bars operatively connected therewith, blocks carried by the respective bars, a lever arranged for oscillatory movement whereby the cam is influenced to uncouple the members of said clutch, said lever also coöperating with a selected one of said blocks to effect limited movement to said bar while the clutch is inoperative and subsequent to such movement of a bar the block is rendered inoperative to permit continued motion to the lever and the cam while the bar remains idle.

8. In transmission gearing for automobiles, the combination with the speed changing gears, shifting devices for the respective gears, and a lever for selectively actuating said shifting devices, of a clutch, a spring acting to yieldingly retain said clutch in operative condition, operative connection between said lever and the clutch whereby the latter is released through the instrumentality of said lever in opposition to said spring, and liquid retarded devices for regulating the reëngagement of said clutch when the spring is rendered operative to effect the reëngagement of the clutch.

CHARLES W. COLLINS.

Witnesses:
H. BARNES,
E. PETERSON.